(12) United States Patent
Kraemer et al.

(10) Patent No.: US 10,745,557 B2
(45) Date of Patent: Aug. 18, 2020

(54) POLYAMIDE MIXTURES COMPRISING POLYAMIDES CONTAINING PYRROLIDONE

(71) Applicant: BASF SE, Ludwigshafen am Rhein (DE)

(72) Inventors: Roland Helmut Kraemer, Shanghai (CN); Motonori Yamamoto, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 73 days.

(21) Appl. No.: 16/078,050

(22) PCT Filed: Jan. 24, 2017

(86) PCT No.: PCT/EP2017/051385
§ 371 (c)(1),
(2) Date: Aug. 21, 2018

(87) PCT Pub. No.: WO2017/144209
PCT Pub. Date: Aug. 31, 2017

(65) Prior Publication Data
US 2019/0048189 A1 Feb. 14, 2019

(30) Foreign Application Priority Data

Feb. 22, 2016 (EP) .................................. 16156764

(51) Int. Cl.
| C08L 77/06 | (2006.01) |
|---|---|
| C08L 77/02 | (2006.01) |
| C08G 73/06 | (2006.01) |
| C08K 3/02 | (2006.01) |
| C08K 5/3492 | (2006.01) |
| C08K 5/5313 | (2006.01) |
| C08L 79/04 | (2006.01) |

(52) U.S. Cl.
CPC .......... *C08L 77/06* (2013.01); *C08G 73/0611* (2013.01); *C08K 3/02* (2013.01); *C08K 5/34922* (2013.01); *C08K 5/5313* (2013.01); *C08L 77/02* (2013.01); *C08L 79/04* (2013.01); *C08K 2003/026* (2013.01); *C08L 2201/02* (2013.01); *C08L 2203/12* (2013.01); *C08L 2203/16* (2013.01)

(58) Field of Classification Search
CPC .......... C08L 77/06; C08L 77/02; C08L 79/04; C08G 73/0611; C08K 3/02; C08K 5/34922; C08K 5/5313
See application file for complete search history.

(56) References Cited

U.S. PATENT DOCUMENTS

| 3,678,015 A | 7/1972 | Holub et al. |
|---|---|---|
| 4,243,777 A | 1/1981 | Sweeney |
| 4,418,189 A | 11/1983 | Morello |
| 4,420,608 A * | 12/1983 | Morello ................. C08G 69/26 528/183 |
| 5,880,252 A | 3/1999 | Kim et al. |
| 2003/0055152 A1 | 3/2003 | Ottenheijm |
| 2015/0175804 A1 | 6/2015 | Aepli |

FOREIGN PATENT DOCUMENTS

| CN | 105175717 A | 12/2015 |
|---|---|---|
| DE | 4333238 A1 | 4/1995 |
| EP | 2 886 605 A1 | 6/2015 |

OTHER PUBLICATIONS

Harashina, H., et al, *Flame Retardants*, pp. 145-156, Conference, 2010 CODEN: 69MZSK, ISBN: 978-1-60741-501-5.
Lyon, R., et al., "Thermal Analysis of Flammability," *Journal of Thermal Analysis and Calorimetry*, vol. 89, No. 2 (2007), pp. 441-448.
Ali, M.S., et al., "Syntheses of High-Performance Biopolyamides Derived From Itaconic Acid and Their Environmental Corrosion," *Macromolecules*, vol. 46, No. 10 (2013), pp. 3719-3725.
International Search Report for Patent Application No. PCT/EP2017/051385, dated May 11, 2017.

* cited by examiner

*Primary Examiner* — John E Uselding
(74) *Attorney, Agent, or Firm* — Marshall, Gerstein & Borun LLP

(57) ABSTRACT

The invention relates to thermoplastic molding compositions comprising
A) 10 to 98 wt % of a thermoplastic polyamide other than B),
B) 1 to 50 wt % of a thermoplastic polyamide comprising units derived from 2-pyrrolidone,
C) 0 to 40 wt % of a halogen-free flame retardant,
D) 0 to 60 wt % of a fibrous or particulate filler or mixtures thereof,
E) 0 to 30 wt % of further added substances,
wherein the weight percentages A) to E) sum to 100%.

11 Claims, No Drawings

POLYAMIDE MIXTURES COMPRISING POLYAMIDES CONTAINING PYRROLIDONE

CROSS-REFERENCE TO RELATED APPLICATIONS

This is the U.S. national phase of International Application No. PCT/EP2017/051385, filed Jan. 24, 2017, which claims the benefit of European Patent Application No. 16156764.9, filed on Feb. 22, 2016.

The invention relates to thermoplastic molding compositions comprising
- A) 10 to 98 wt % of a thermoplastic polyamide other than B),
- B) 1 to 50 wt % of a thermoplastic polyamide comprising units derived from 2-pyrrolidone,
- C) 0 to 40 wt % of a halogen-free flame retardant,
- D) 0 to 60 wt % of a fibrous or particulate filler or mixtures thereof,
- E) 0 to 30 wt % of further added substances, wherein the weight percentages A) to E) sum to 100%.

The present invention further relates to flame retardant molding compositions composed of these polyamide mixtures and to the use of such molding compositions for producing fibers, films and molded articles and to the thus obtainable molded articles, fibers and films of any type.

Pyrrolidone-containing polymers are described in the teachings of U.S. Pat. No. 3,678,015 and DE-A 4333238A1.

Academic studies (Ali et. al., Macromolecules 2013, 46, 3719-3725) describe such polyamides as biodegradable polymers.

It is known that addition of generally semiaromatic polyamides makes it possible to increase the flame resistance of red phosphorus in polyesters (Harashina, Hatsuhiko et al., Flame Retardants, Pages: 145-156, Conference, 2010, CODEN: 69MZSK, ISBN: 978-1-60741-501-5).

Moreover, the general literature attests that plastics having a lower heat release capacity and a lower specific heat of combustion exhibit a higher flame resistance (R. Lyon et al., Journal of Thermal Analysis and calorimetry, Vol. 89 (2007) 2, 441-448).

The present invention accordingly has for its object the provision of thermoplastic molding compositions which through mixing of polyamides with pyrrolidone-containing polyamides exhibit a lower heat release capacity and a lower specific heat of combustion which shall result in an intrinsically better flame resistance of the materials.

Surface properties (particularly gloss) and adhesion to metal surfaces shall also be improved. The flowability and likewise the amount of residue after combustion should be improved. The better intrinsic flame retardancy shall reduce the addition of flame retardants required to achieve a UL 94 V0 classification since said flame retardants often have a detrimental effect on the properties of the polyamides.

The molding compositions defined at the outset were accordingly found. Preferred embodiments are set out in the subclaims.

As component A) the molding compositions according to the invention comprise 10 to 98, preferably 20 to 90 and in particular 30 to 80 wt % of at least one polyamide other than B).

The polyamides of the molding compositions according to the invention generally have a viscosity number of from 90 to 350 and preferably 110 to 240 ml/g determined in a 0.5 wt % solution in 96 wt % sulfuric acid at 25° C. in accordance with ISO 307.

Preference is given to semicrystalline or amorphous resins with a molecular weight Mw (weight-average) of at least 5000 as described in U.S. Pat. Nos. 2,071,250, 2,071,251, 2,130,523, 2,130,948, 2,241,322, 2,312,966, 2,512,606 and 3,393,210 for example.

Examples thereof include polyamides derived from lactams having 7 to 13 ring members, such as polycaprolactam, polycaprylolactam and polylaurolactam and also polyamides obtained by reacting dicarboxylic acids with diamines.

Usable dicarboxylic acids are alkanedicarboxylic acids having 6 to 12 and in particular 6 to 10 carbon atoms and aromatic dicarboxylic acids. Adipic acid, azelaic acid, sebacic acid, dodecanedioic acid and terephthalic and/or isophthalic acid may be mentioned here.

Suitable diamines include in particular alkane diamines having 6 to 12 and in particular 6 to 8 carbon atoms and also m-xylylenediamine (for example Ultramid® X17 from BASF SE, a 1:1 molar ratio of MXDA with adipic acid), di-(4-aminophenyl)methane, di-(4-aminocyclohexyl)methane, 2,2-di-(4-aminophenyl)propane, 2,2-di-(4-aminocyclohexyl)propane and 1,5-diamino-2-methylpentane.

Preferred polyamides are polyhexamethylene adipamide, polyhexamethylene sebacamide and polycaprolactam and also copolyamides 6/66, in particular having a proportion of caprolactam units of from 5 to 95 wt % (for example Ultramid® C31 from BASF SE).

Further suitable polyamides are obtainable from w-aminoalkyl nitriles, for example aminocapronitrile (PA 6) and adipodinitrile with hexamethylenediamine (PA 66) by so-called direct polymerization in the presence of water, as described in DE-A 10313681, EP-A 1198491 and EP 922065 for example.

Polyamides obtainable for example by condensation of 1,4-diaminobutane with adipic acid at elevated temperature (polyamide-4,6) may also be mentioned. Production processes for polyamides having this structure are described in EP-A 38 094, EP-A 38 582 and EP-A 39 524 for example.

Also suitable are polyamides obtainable by copolymerization of two or more of the abovementioned monomers or mixtures of a plurality of polyamides in any desired mixing ratio. Particular preference is given to mixtures of polyamide 66 with other polyamides, in particular copolyamides 6/66.

Furthermore, partially aromatic copolyamides such as PA 6/6T and PA 66/6T having a triamine content of less than 0.5 and preferably less than 0.3 wt % have proven particularly advantageous (see EP-A 299 444). Further high-temperature-resistant polyamides are disclosed in EP-A 19 94 075 (PA 6T/6I/MXD6).

The preferred partly aromatic copolyamides having a low triamine content may be produced by the processes described in EP-A 129 195 and 129 196.

The following nonexhaustive list contains the polyamides mentioned and also further polyamides A) within the meaning of the invention, and the monomers present.

AB Polymers:
PA 6 ε-caprolactam
PA 7 enantholactam
PA 8 caprylolactam
PA 9 9-aminopelargonic acid
PA 11 11-aminoundecanoic acid
PA 12 laurolactam AA/BB Polymers:
PA 46 tetramethylenediamine, adipic acid
PA 66 hexamethylenediamine, adipic acid
PA 69 hexamethylenediamine, azelaic acid
PA 610 hexamethylenediamine, sebacic acid PA 612 hexamethylenediamine, decanedicarboxylic acid
PA 613 hexamethylenediamine, undecanedicarboxylic acid
PA 1212 1,12-dodecanediamine, decanedicarboxylic acid
PA 1313 1,13-diaminotridecane, undecanedicarboxylic acid
PA 6T hexamethylenediamine, terephthalic acid
PA 9T 1,9-nonanediamine, terephthalic acid
PA MXD6 m-xylylenediamine, adipic acid
PA 6I hexamethylenediamine, isophthalic acid
PA 6-3-T trimethylhexamethylenediamine, terephthalic acid
PA 6/6T (see PA 6 and PA 6T)
PA 6/66 (see PA 6 and PA 66)
PA 6/12 (see PA 6 and PA 12)
PA 66/6/610 (see PA 66, PA 6 and PA 610)
PA 6I/6T (see PA 6I and PA 6T)
PA PACM 12 diaminodicyclohexylmethane, dodecanedioic acid
PA 6I/6T/PACM as PA 6I/6T+diaminodicyclohexylmethane
PA 12/MACMI laurolactam, dimethyldiaminodicyclohexylmethane, isophthalic acid
PA 12/MACMT laurolactam, dimethyldiaminodicyclohexylmethane, terephthalic acid
PA PDA-T phenylenediamine, terephthalic acid
PA410 1,4-tetramethylenediamine, sebacic acid
PA510 1,5-pentamethylenediamine, sebacic acid
PA10T 1,10-decanediamine, terephthalic acid As component B) the molding compositions according to the invention comprise 1 to 50, in particular 1 to 30, preferably 3 to 25 and in particular 5 to 25, wt % of a thermoplastic polyamide other than A) comprising units derived from 2-pyrrolidone.

Römpps Online Lexikon (April 2007) lists the following synonyms for 2-pyrrolidone: pyrrolidin-2-one, 4-aminobutyric acid lactam, γ-butyrolactam, 2-oxopyrrolidone.

The term "derived" is to be understood as meaning that the repeating unit being formed is not "pure" 2-pyrrolidone but rather is substituted by the further repeating units or is bonded thereto (see also U.S. Pat. No. 4,418,189).

Such polyamides B) are obtainable by polycondensation of a monomer mixture, based on 100 mol % of B1) and B2), of B1) 12.5 to 50 mol %, preferably 20 to 50 mol %, of itaconic acid, wherein 0 to 37.5 mol %, preferably 0 to 30 mol %, of further dicarboxylic acids (distinct from itaconic acid) may be present, B2) 12.5 to 50 mol %, preferably 20 to 50 mol %, of at least one diamine comprising an aromatic ring, wherein 0 to 37.5 mol %, preferably 0 to 30 mol %, of further diamines may be present.

The polycondensation is carried out as is generally typical by mixing the monomers in generally aqueous, or predominately aqueous, solution and subsequently removing the solvent at reduced pressure and/or elevated temperature. The temperatures and pressures are generally from 150° C. to 320° C., preferably from 180° C. to 280° C., and from 0 to 30 bar. The residence times are generally from 1 h to 30 h, preferably from 1 h to 20 h.

Depending on the monomer ratio this forms block structures or alternating structures in the polymer chain which shall be illustrated with reference to the following preferred examples:

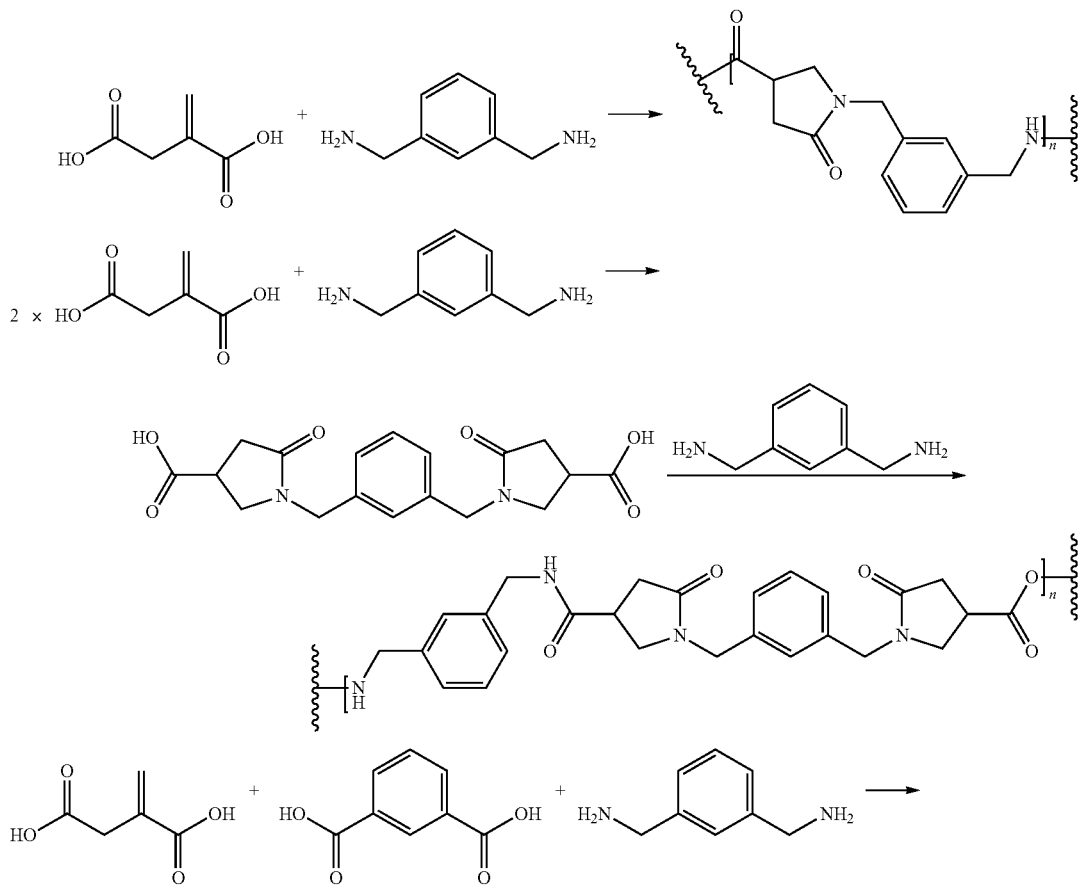

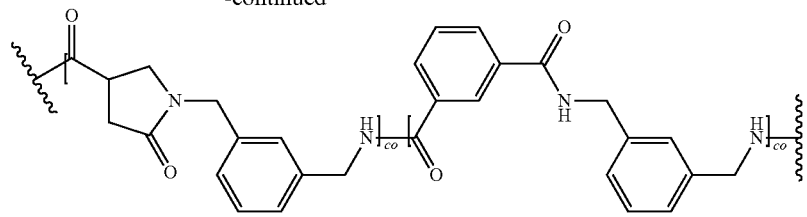

The last equation depicts an example of a preferred copolyamide of itaconic acid/terephthalic acid and m-xylylenediamine.

The molecular weight of components B) is generally Mn (number-average) of component B) according to GPC (PMMA standard and HFIP eluent) from 1000 to 30 000 g/mol, preferably from 1500 to 25 000 g/mol, and the weight average Mw is generally 2000 to 150 000, preferably 2500 to 100 000, g/mol determined by means of GPC as described in detail hereinbelow.

The molecular weight Mn/Mw of the polyamides was determined as follows:

15 mg of the semiaromatic polyamides were dissolved in 10 ml of hexafluoroisopropanol (HFIP). 125 µl respectively of these solutions were analyzed by means of gel permeation chromatography (GPC). The measurements were carried out at room temperature. Elution was effected using HFIP+0.05 wt % of potassium trifluoroacetate salt. The elution rate was 0.5 ml/min. The following column combination was employed (all columns produced by Showa Denko Ltd., Japan): Shodex® HFIP-800P (diameter 8 mm, length 5 cm), Shodex® HFIP-803 (diameter 8 mm, length 30 cm), Shodex® HFIP-803 (diameter 8 mm, length 30 cm). The semi-aromatic polyamides were detected by means of an RI detector (differential refractometry). Calibration was effected with narrowly distributed polymethyl methacrylate standards having molecular weights of $M_n$=505 g/mol to $M_n$=2 740 000 g/mol.

As aliphatic dicarboxylic acids B1) and derivatives thereof it is generally those having 2 to 40 carbon atoms, preferably 4 to 18 carbon atoms, that are contemplated. They may be either linear or branched. The cycloaliphatic dicarboxylic acids usable in the context of the present invention are generally those having 7 to 10 carbon atoms and in particular those having 8 carbon atoms. However, it is also possible in principle to employ dicarboxylic acids having a greater number of carbon atoms, for example having up to 30 carbon atoms.

Examples that may be mentioned include: malonic acid, succinic acid, glutaric acid, 2-methylglutaric acid, 3-methylglutaric acid, adipic acid, pimelic acid, suberic acid, azelaic acid, sebacic acid, undecanedioic acid, dodecanedioic acid, brassylic acid, tetradecanedioic acid, octadecanedioic acid, fumaric acid, 2,2-dimethylglutaric acid, suberic acid, dimer fatty acid (for example Empol® 1061 from BASF), 1,3-cyclopentanedicarboxylic acid, 1,4-cyclohexanedicarboxylic acid, 1,3-cyclohexanedicarboxylic acid, diglycolic acid, maleic acid, maleic anhydride and 2,5-norbornanedicarboxylic acid.

Likewise usable ester-forming derivatives of the above-mentioned aliphatic or cycloaliphatic dicarboxylic acids that may be mentioned are in particular di-$C_1$- to $C_6$-alkyl esters, such as dimethyl, diethyl, di-n-propyl, diisopropyl, di-n-butyl, diisobutyl, di-t-butyl, di-n-pentyl, diisopentyl or di-n-hexyl esters. Anhydrides of the dicarboxylic acids may likewise be employed.

These dicarboxylic acids or the ester-forming derivatives thereof may be used individually or as a mixture of two or more thereof.

Preference is given to using succinic acid, adipic acid, azelaic acid, sebacic acid, brassylic acid or their respective ester-forming derivatives or mixtures thereof. Particular preference is given to using succinic acid, adipic acid or sebacic acid or their respective ester-forming derivatives or mixtures thereof.

Using adipic acid or the ester-forming derivatives thereof, such as alkyl esters thereof or mixtures thereof, is especially preferred. Preferably employed aliphatic dicarboxylic acids are sebacic acid or mixtures of sebacic acid with adipic acid.

Aromatic dicarboxylic acids that may be mentioned are generally those having 6 to 12 carbon atoms and preferably those having 8 carbon atoms. Examples that may be mentioned include terephthalic acid, isophthalic acid, phthalic acid, 2,5-furandicarboxylic acid, 5-sulfoisophthalic acid sodium salt, 2,6-naphthalenedicarboxylic acid, 1,4-naphthalenedicarboxylic acid, 1,8-naphthalenedicarboxylic acid, 1,5-naphthalenedicarboxylic acid and anthracenedicarboxylic acid and ester-forming derivatives thereof. The di-$C_1$- to $C_6$-alkyl esters, for example dimethyl, diethyl, di-n-propyl, diisopropyl, di-n-butyl, diisobutyl, di-t-butyl, di-n-pentyl, diisopentyl or di-n-hexyl esters, in particular may be mentioned. The anhydrides of the dicarboxylic acids a2 are likewise suitable ester-forming derivatives.

However, it is also possible in principle to employ aromatic dicarboxylic acids having a greater number of carbon atoms, for example up to 20 carbon atoms.

The aromatic dicarboxylic acids or the ester-forming derivatives thereof may be used individually or as a mixture of two or more thereof. Particular preference is given to using terephthalic acid or the ester-forming derivatives thereof such as dimethyl terephthalate.

The use of sulfonate-containing compounds such as an alkali metal or alkaline earth metal salt of a sulfonate-containing dicarboxylic acid or the ester-forming derivatives thereof is also typical. Preference is given to alkali metal salts of 5-sulphoisophthalic acid or mixtures thereof, the sodium salt being particularly preferable.

As component B2) the monomers of polyamide B) comprise diamines having an aromatic ring having 6 to 30 carbon atoms selected from the group of m-xylylenediamine, p-xylylenediamine, m- or p-phenylenediamine, 4,4'-oxydianiline, 4,4'-methylenebisbenzylamine, 1,1'-biphenyl-4,4'diamine, 2,5-bis(aminomethyl)furan or mixtures thereof, preference being given to m- and p-xylylenediamine.

These diamines B2) may generally be present in a mixture or in a mixture with branched or linear alkanediamines having 2 to 18 carbon atoms.

Examples of suitable alkanediamines include 1,2-ethylenediamine, 1,2-propanediamine, 1,3-propanediamine, 1,2-butanediamine, 1,3-butanediamine, 1,4-butanediamine, 1,5-pentanediamine, 2-methyl-1,5-pentanediamine, 1,6- hexanediamine, 2,4-dimethyl-2-ethylhexane-1,3-diamine, 2,2-dimethyl-1,3-propanediamine, 2-ethyl-2-butyl-1,3-propanediamine, 2-ethyl-2-isobutyl-1,3-propanediamine, 2,2,4-trimethyl-1,6-hexanediamine, in particular ethylenediamine, 1,3-propanediamine, 1,4-butanediamine and 2,2-dimethyl-1,3-propanediamine (neopentyldiamine); cyclopentanediamine, 1,4-cyclohexanediamine, 1,2-cyclohexanedimethanol, 1,3-cyclohexanedimethanol, 1,4-cyclohexanedimethanol, 2,5-bis(aminomethyl)tetrahydrofuran, 4,4'-methylenebiscyclohexanamine, 4,4'-methylenebis(2-methylcyclohexanamine), or 2,2,4,4-tetramethyl-1,3-cyclobutanediamine. Mixtures of different alkanediamines may also be employed.

Preferred combinations—in the abovementioned quantitative ratios—of the monomers B1) and B2) are itaconic acid with m- or p-xylylenediamine or 2,5-bis(aminomethyl) furan or mixtures thereof.

The content of component C) in the molding compositions according to the invention is 0 to 40, preferably 1 to 30 and in particular 2 to 25 and in particular 2 to 18, wt % based on the sum of components A) to E).

A preferred halogen-free flame retardant C) is elemental red phosphorus, in particular in combination with glass-fiber-reinforced molding compositions, which may be employed in untreated form.

Particularly suitable, however, are preparations in which the phosphorus is surfacially coated with low molecular weight liquid substances such as silicon oil, paraffin oil or esters of phthalic acid (in particular dioctyl phthalate, see EP 176 836) or adipic acid or with polymeric or oligomeric compounds, for example with phenol resins or aminoplasts and also polyurethanes (see EP-A 384 232, DE-A 196 48 503). Such so-called phlegmatizers are generally present in amounts of 0.05 to 5 wt % based on 100 wt % of B).

Concentrates of red phosphorus, for example in a polyamide A) or elastomer E), are also suitable flame retardants. Polyolefin homopolymers and copolymers in particular are suitable concentrate polymers. However, in case no polyamide is used as the thermoplastic, the proportion of the concentrate polymer should not exceed 35 wt % based on the weight of components A) to E) in the molding compositions according to the invention.

Preferred concentrate constitutions are

B$_1$) 30 to 90 wt %, preferably from 45 to 70 wt %, of a polyamide or elastomer, B$_2$) 10 to 70 wt %, preferably from 30 to 55 wt %, of red phosphorus.

The employed polyamide for the batch may be distinct from A) or preferably identical to A) so that incompatibilities or melting point differences do not have a negative effect on the molding composition.

The average particle size (d$_{50}$) of the phosphorus particles distributed in the molding compositions is preferably in the range from 0.0001 to 0.5 mm; in particular from 0.001 to 0.2 mm.

As component C) the molding compositions according to the invention may comprise 0 to 40, preferably 1 to 30, preferably 1 to 15 and in particular 5 to 10, wt % based on A) to E) of a phosphinic acid salt as the halogen-free flame retardant.

Suitable components C) are phosphinic acid salts of formula (I) or/and diphosphinic acid salts of formula (II) or polymers thereof

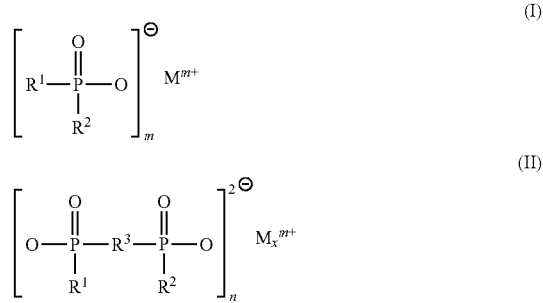

where

R$^1$, R$^2$ are identical or different and represent hydrogen, C1-C$_6$-alkyl, linear or branched, and/or aryl;

R$^3$ represents C$_1$-C$_{10}$-alkylene, linear or branched, C$_6$-C$_{10}$-arylene, -alkylarylene or -arylalkylene;

M represents Mg, Ca, Al, Sb, Sn, Ge, Ti, Zn, Fe, Zr, Ce, Bi, Sr, Mn, Li, Na, K and/or a protonated nitrogen base;

m=1 to 4; n=1 to 5; x=1 to 4, preferably m=3, x=3.

Preferably, R$^1$, R$^2$ in component B are identical or different and represent hydrogen, methyl, ethyl, n-propyl, isopropyl, n-butyl, tert.-butyl, n-pentyl and/or phenyl.

Preferably, R$^3$ in component B represents methylene, ethylene, n-propylene, isopropylene, n-butylene, tert-butylene, n-pentylene, n-octylene or n-dodecylene, phenylene or naphthylene; methylphenylene, ethylphenylene, tert-butylphenylene, methylnaphthylene, ethylnaphthylene or tert-butylnaphthylene; phenylmethylene, phenylethylene, phenylpropylene or phenylbutylene.

Particularly preferably, R$^1$, R$^2$ is hydrogen, methyl, ethyl and M=Al, particular preference being given to Al hypophosphite.

Production of the phosphinates is preferably effected by precipitation of the corresponding metal salts from aqueous solutions. However, the phosphinates may also be precipitated in the presence of a suitable inorganic metal oxide or sulfide as support material (white pigments, for example TiO$_2$, SnO$_2$, ZnO, ZnS, SiO$_2$). This accordingly affords surface-modified pigments which can be employed as laser-markable flame retardants for thermoplastic polyesters.

As component C) the molding compositions according to the invention may comprise 0 to 40, preferably 1 to 30, preferably 1 to 15 and in particular 3 to 12, wt % of a nitrogen-containing flame retardant, preferably of a melamine compound.

The melamine cyanurate preferentially suitable according to the invention (component C) is a reaction product of preferably equimolar amounts of melamine (formula I) and cyanuric acid/isocyanuric acid (formulae Ia and Ib).

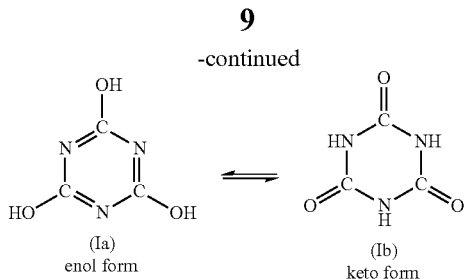

(Ia) enol form ⇌ (Ib) keto form

It is obtained for example by reaction of aqueous solutions of the starting compounds at 90° C. to 100° C. The commercially available product is a white powder having an average grain size $d_{50}$ of 1.5-7 μm and a $d_{99}$ value of less than 50 μm.

Further suitable compounds (often also described as salts or adducts) are melamine sulfate, melamine, melamine borate, oxalate, phosphate prim., phosphate sec. and pyrophosphate sec., melamine neopentyl glycol borate, and polymeric melamine phosphate (CAS No. 56386-64-2 and 218768-84-4).

Preference is given to melamine polyphosphate salts of a 1,3,5-triazine compound which have an average degree of condensation number n between 20 and 200 and a 1,3,5-triazine content of 1.1 to 2.0 mol of a 1,3,5-triazine compound, selected from the group consisting of melamine, melam, melem, melon, ammeline, ammelide, 2-ureidomelamine, acetoguanamine, benzoguanamine and diaminophenyltriazine, per mole of phosphorus atom. Preferably, the n-value of such salts is generally between 40 and 150 and the ratio of a 1,3,5-triazines compound per mole of phosphorus atom is preferably between 1.2 and 1.8. The pH of a 10 wt % aqueous slurry of salts produced as per EP-B1095030 is moreover generally more than 4.5 and preferably at least 5.0. The pH is typically determined by adding 25 g of the salt and 225 g of clean water at 25° C. into a 300 ml beaker, stirring the resultant aqueous slurry for 30 minutes and then measuring the pH. The abovementioned n-value, the number-average degree of condensation, may be determined by means of 31P solid-state NMR. J. R. van Wazer, C. F. Callis, J. Shoolery and R. Jones, J. Am. Chem. Soc., 78, 5715, 1956 discloses that the number of adjacent phosphate groups gives a unique chemical shift which permits clear distinction between orthophosphates, pyrophosphates, and polyphosphates. EP1095030B1 also describes a process for producing the desired polyphosphate salt of a 1,3,5-triazine compound which has an n-value of from 20 to 200 and where the 1,3,5-triazine content is 1.1 to 2.0 mol of a 1,3,5-triazine compound. This process comprises conversion of a 1,3,5-triazine compound into its orthophosphate with orthophosphoric acid followed by dehydration and heat treatment to convert the orthophosphate salt into a polyphosphate of the 1,3,5-triazine compound. This heat treatment is preferably carried out at a temperature of at least 300° C. and preferably at at least 310° C. In addition to orthophosphates of 1,3,5-triazine compounds it is likewise possible to use other 1,3,5-triazine phosphates, including a mixture of orthophosphates and pyrophosphates for example.

Suitable guanidine salts are:

| | CAS No. |
|---|---|
| g carbonate | 593-85-1 |
| g cyanurate prim. | 70285-19-7 |
| g phosphate prim. | 5423-22-3 |
| g phosphate sec. | 5423-23-4 |
| g sulfate prim. | 646-34-4 |
| g sulfate sec. | 594-14-9 |
| guanidine pentaerythritol borate | n.a. |
| guanidine neopentyl glycol borate | n.a. |
| and urea phosphate green | 4861-19-2 |
| urea cyanurate | 57517-11-0 |
| ammelin | 645-92-1 |
| ammelid | 645-93-2 |
| melem | 1502-47-2 |
| melon | 32518-77-7 |

In the context of the present invention "compounds" is to be understood as meaning not only for example benzoguanamine itself and the adducts/salts thereof but also the nitrogen-substituted derivatives and the adducts/salts thereof.

Also suitable are ammonium polyphosphate $(NH_4PO_3)_n$ where n is about 200 to 1000, preferably 600 to 800, and tris(hydroxyethyl)isocyanurate (THEIC) of formula IV

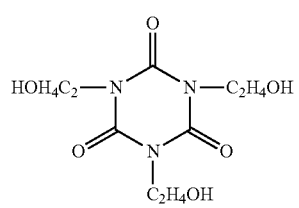

IV or the reaction products thereof with aromatic carboxylic acids $Ar(COOH)_m$ which may optionally be in a mixture with one another, wherein Ar represents a monocyclic, bicyclic or tricyclic aromatic six-membered ring system and m is 2, 3 or 4.

Examples of suitable carboxylic acids include phthalic acid, isophthalic acid, terephthalic acid, 1,3,5-benzenetricarboxylic acid, 1,2,4-benzenetricarboxylic acid, pyromellitic acid, mellophanic acid, prehnitic acid, 1-naphthoic acid, 2-naphthoic acid, naphthalenedicarboxylic acids, and anthracenecarboxylic acids.

Production is effected by reaction of the tris(hydroxyethyl)isocyanurate with the acids, the alkyl esters thereof or the halides thereof according to the processes in EP-A 584 567.

Such reaction products are a mixture of monomeric and oligomeric esters which may also be crosslinked. The degree of oligomerization is typically 2 to about 100, preferably 2 to 20. Preference is given to using mixtures of THEIC and/or reaction products thereof with phosphorus-containing nitrogen compounds, in particular $(NH_4PO_3)_n$ or melamine pyrophosphate or polymeric melamine phosphate. The mixing ratio for example of $(NH_4PO_3)_n$ to THEIC is preferably 90 to 50:10 to 50, in particular 80 to 50:50 to 20, wt % based on the mixture of such components B1).

Also suitable are benzoguanidine compounds of formula V

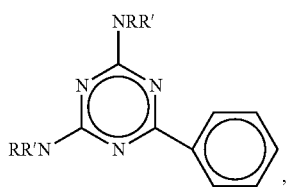

(V)

in which R, R' represents straight-chain or branched alkyl radicals having 1 to 10 carbon atoms, preferably hydrogen, and in particular adducts thereof with phosphoric acid, boric acid and/or pyrophosphoric acid.

Also preferred are allantoin compounds of formula VI,

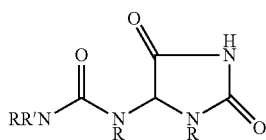

(VI)

wherein R, R' are as defined in formula V, and also the salts thereof with phosphoric acid, boric acid and/or pyrophosphoric acid and also glycolurils of formula VII or the salts thereof with the abovementioned acids

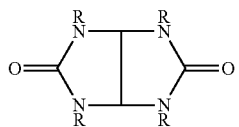

(VII)

in which R is as defined in formula V.

Suitable products are commercially available or obtainable as per DE-A 196 14 424.

The cyanoguanidine (formula VIII) usable in accordance with the invention is obtainable for example by reacting calcium cyanamide with carbonic acid, the cyanamide produced dimerizing at from pH 9 to pH 10 to afford cyanoguanidine.

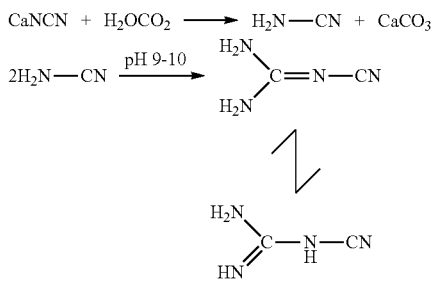

VIII

The commercially available product is a white powder having a melting point from 209° C. to 211° C.

It is very particularly preferable to employ, in accordance with the invention, melamine cyanurate preferably having the particle size distribution:
$d_{98} < 25$ μm, preferably <20 μm
$d_{50} < 4.5$ μm, preferably <3 μm.

A $d_{50}$ value is generally understood by those skilled in the art as meaning the particle size at which 50% of the particles have a smaller particle size and 50% have a larger particle size.

Particle size distribution is typically determined by laser diffraction (as per ISO 13320).

As fibrous or particulate fillers D) mention may be made of carbon fibers, glass fibers, glass beads, amorphous silica, calcium silicate, calcium metasilicate, magnesium carbonate, kaolin, chalk, pulverulent quartz, mica, barium sulfate and feldspar, which may be employed in amounts of from 0 to 50, preferably from 5 to 50, wt %, in particular 10 to 40 wt %.

Preferred fibrous fillers that may be mentioned are carbon fibers, aramid fibers, and potassium titanate fibers, particular preference being given to glass fibers in the form of E-glass. These may be employed as rovings or chopped glass in the commercially available forms.

The fibrous fillers may comprise a silane compound surface-pretreatment to improve compatibility with the thermoplastic.

Suitable silane compounds are those of general formula $(X-(CH_2)_n)_k-Si-(O-C_mH_{2m+1})_{4-k}$ in which the substituents have the following meaning:

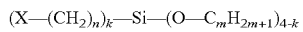
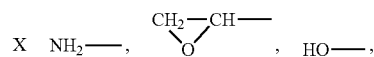

n an integer from 2 to 10, preferably 3 to 4
m an integer from 1 to 5, preferably 1 to 2
k an integer from 1 to 3, preferably 1.

Preferred silane compounds are aminopropyltrimethoxysilane, aminobutyltrimethoxysilane, aminopropyltriethoxysilane, aminobutyltriethoxysilane and also the corresponding silanes which comprise as substituent X a glycidyl group.

The silane compounds are generally used for surface coating in amounts of from 0.01 to 2, preferably 0.025 to 1.0 and in particular 0.05 to 0.5 wt % (based on D)).

Acicular mineral fillers are also suitable.

In the context of the invention the term acicular mineral fillers is to be understood as meaning mineral fillers of strong acicular character. One example is acicular wollastonite. The mineral preferably has an L/D (length/diameter) ratio of from 8:1 to 35:1, preferably 8:1 to 11:1. The mineral filler may optionally have been pretreated with the abovementioned silane compounds but pretreatment is not an absolute requirement.

Further fillers that may be mentioned are kaolin, calcined kaolin, wollastonite, talc and chalk, precipitated calcite and also lamellar or acicular nanofillers, preferably in amounts between 0.1 and 10%. Preferably employed to this end are mica, böhmite, bentonite, montmorillonite, vermiculite, zinc oxide in acicular form and hectorite. To obtain good compatibility of the lamellar nanofillers with the organic binder, the lamellar nanofillers are subjected to prior art organic modification. Addition of the lamellar or acicular nanofillers to the nanocomposites of the invention further enhances mechanical strength.

As component E) the molding compositions may comprise further added substances in amounts from 0 to 30, preferably 0 to 20, wt %. Contemplated here in amounts of 1 to 10, preferably 0.5 to 10, in particular 1 to 8, wt % are elastomeric polymers (often also referred to as impact modifiers, elastomers or rubbers).

Very generally these are copolymers preferably constructed from at least two of the following monomers: ethylene, propylene, butadiene, isobutene, isoprene, chloroprene, vinyl acetate, styrene, acrylonitrile and acrylic or methacrylic esters having 1 to 18 carbon atoms in the alcohol component.

Such polymers are described for example in Houben-Weyl, Methoden der organischen Chemie, Vol. 14/1 (Georg-Thieme-Verlag, Stuttgart, 1961), pages 392 to 406 and in the monograph "Toughened Plastics" by C. B. Bucknall (Applied Science Publishers, London, 1977).

Some preferred types of such elastomers are presented hereinbelow.

Preferred components E) are impact modifiers based on ethylene copolymers constructed from:

$E_1$) 40 to 98 wt %, preferably 50 to 94.5 wt %, of ethylene,
$E_2$) 2 to 40 wt %, preferably 5 to 40 wt %, of a (meth)acrylate having 1 to 18 carbon atoms, or/and
$E_3$) 0 to 20 wt %, preferably 0.05 to 10 wt %, of functional monomers selected from the group of ethylenically unsaturated mono- or dicarboxylic acids
   or carboxylic anhydrides or epoxide groups or mixtures thereof, wherein the weight percentages $E_1$) to $E_3$) sum to 100%.
or
an ethylene-(meth)acrylic acid copolymer 72% neutralized with zinc.

Particular preference is given to ethylene copolymers constructed from:

$E_1$) 50 to 69.9 wt % of ethylene
$E_2$) 30 to 40 wt % of a methacrylate having 1 to 18 carbon atoms,
$E_3$) 0.1 to 10 wt % of functional monomers according to claim 1,
wherein the weight percentages $E_1$) to $E_3$) sum to 100%.

The proportion of functional groups $E_3$) is 0.05 to 5, preferably 0.2 to 4, and in particular 0.3 to 3.5, wt % based on 100 wt % of E).

Particularly preferred components $E_3$) are constructed from an ethylenically unsaturated mono- or dicarboxylic acid or from a functional derivative of such an acid.

Primary, secondary and tertiary $C_1$-$C_{18}$-alkyl esters of acrylic acid or methacrylic acid $D_2$ are suitable in principle, but esters having 1-12 carbon atoms, in particular having 2-10 carbon atoms, are preferred.

Examples thereof include methyl, ethyl, propyl, n-butyl, i-butyl, t-butyl, 2-ethylhexyl, octyl and decyl acrylates and the corresponding esters of methacrylic acid. Among these, particular preference is given to
n-butyl acrylate and 2-ethylhexyl acrylate.

In addition to the esters, the olefin polymers may also comprise acid-functional and or latently acid-functional monomers of ethylenically unsaturated mono- or dicarboxylic acids or monomers comprising epoxy groups.

Further examples of monomers $E_3$) include acrylic acid, methacrylic acid, tertiary alkyl esters of these acids, in particular butyl acrylate and dicarboxylic acids such as maleic acid and fumaric acid or anhydrides of these acids and also the monoesters thereof.

The term latently acid-functional monomers is to be understood as meaning compounds forming free acid groups under the polymerization conditions/during incorporation of the olefin polymers into the molding compositions. Examples thereof include anhydrides of dicarboxylic acids having up to 20 carbon atoms, in particular maleic anhydride and tertiary $C_1$-$C_{12}$ alkyl esters of the abovementioned acids, in particular tert-butyl acrylate and tert-butyl methacrylate.

Production of the abovedescribed ethylene copolymers may be effected by processes known per se, preferably by random copolymerization under high pressure and elevated temperature.

The melt flow index of the ethylene copolymers is generally in the range from 1 to 80 g/10 min (measured at 190° C. under a load of 2.16 kg).

The molecular weight of these ethylene copolymers is between 10 000 and 500 000 g/mol, preferably between 15 000 and 400 000 g/mol (Mn, determined by GPC in 1,2,4-trichlorobenzene with PS calibration).

Preferably employed commercially available products are Fusabond® A 560, Lucalen® A 2910, Lucalen® A 3110, Nucrel 3990, Nucrel 925, Lotader A×9800, 3 getabond FS 7 M.

The abovedescribed ethylene copolymers may be produced by processes known per se, preferably by random copolymerization under high pressure and elevated temperature. Corresponding processes are common knowledge.

Preferred elastomers also include emulsion polymers, the production of which is described for example by Blackley in the monograph "Emulsion Polymerization". The usable emulsifiers and catalysts are known per se.

Copolymers comprising no units $E_2$) but where the acid component $E_3$) has been neutralized with Zn are especially preferred. Preference is given here to ethylene-(meth)acrylic acid copolymers 72% neutralized with zinc (commercially available as Surlyn® 9520 from DuPont).

It will be appreciated that it is also possible to employ mixtures of the rubber types cited hereinabove.

Further added substances E) may be present in amounts up to 30, preferably up to 20, wt %.

As component E) the molding compositions according to the invention may comprise 0.05 to 3, preferably 0.1 to 1.5 and in particular 0.1 to 1, wt % of a lubricant.

Preference is given to aluminum salts, alkali metal salts, alkaline earth metal salts or esters or amides of fatty acids having 10 to 44 carbon atoms, preferably having 12 to 44 carbon atoms. The metal ions are preferably alkaline earth metal and aluminum, particular preference being given to calcium or magnesium.

Preferred metal salts are calcium stearate and calcium montanate and also aluminum stearate.

It is also possible to employ mixtures of various salts in any desired mixture ratio.

The carboxylic acids may be mono- or dibasic. Examples that may be mentioned include pelargonic acid, palmitic acid, lauric acid, margaric acid, dodecanedioic acid, behenic acid, and particularly preferably stearic acid, capric acid and montanic acid (a mixture of fatty acids having 30 to 40 carbon atoms).

The aliphatic alcohols may be mono- to tetrahydric. Examples of alcohols include n-butanol, n-octanol, stearyl alcohol, ethylene glycol, propylene glycol, neopentyl glycol, pentaerythritol, particular preference being given to glycerol and pentaerythritol.

The aliphatic amines may be mono- to trifunctional. Examples thereof include stearylamine, ethylenediamine, propylenediamine, hexamethylenediamine, di(6-aminohexyl)amine, particular preference being given to ethylenediamine and hexamethylenediamine. Preferred esters or amides are correspondingly glyceryl distearate, glyceryl tristearate, ethylenediamine distearate, glyceryl monopalmitate, glyceryl trilaurate, glyceryl monobehenate and pentaerythrityl tetrastearate.

It is also possible to use mixtures of various esters or amides or esters combined with amides, in which case the mixing ratio is as desired.

As component E) the molding compositions according to the invention may comprise 0.05 to 3, preferably 0.1 to 1.5 and in particular 0.1 to 1, wt % of a Cu stabilizer, preferably of a copper(I) halide, in particular in a mixture with an alkali metal halide, preferably KI, in particular in a ratio of 1:4.

Salts of monovalent copper preferably contemplated are copper(I) complexes with $PPh_3$, copper(I) acetate, copper(I) chloride, bromide and iodide. These are present in amounts of 5 to 500 ppm of copper, preferably 10 to 250 ppm, based on polyamide.

The advantageous properties are in particular obtained when the copper is present in the polyamide in the form of a molecular dispersion. This is achieved when the molding composition is admixed with a concentrate comprising the polyamide, a salt of monovalent copper, and an alkali metal halide in the form of a solid, homogeneous solution. A typical concentrate is composed for example of 79 to 95 wt % of polyamide and 21 to 5 wt % of a mixture of copper iodide or bromide and potassium iodide. The concentration of copper in the solid homogeneous solution is preferably between 0.3 and 3, in particular between 0.5 and 2, wt %, based on the total weight of the solution, and the molar ratio of copper(I) iodide to potassium iodide is between 1 and 11.5, preferably between 1 and 5.

Suitable polyamides for the concentrate are homopolyamides and copolyamides, in particular polyamide 6 and polyamide 6.6.

Suitable sterically hindered phenols E) are in principle all compounds having a phenolic structure and having at least one sterically demanding group on the phenolic ring.

Preferably contemplated compounds are for example those of formula

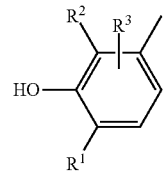

where
$R^1$ and $R^2$ represent an alkyl group, a substituted alkyl group or a substituted triazole group, where the radicals $R^1$ and $R^2$ may be identical or different and $R^3$ represents an alkyl group, a substituted alkyl group, an alkoxy group or a substituted amino group.

Antioxidants of the cited type are described in DE-A 27 02 661 (U.S. Pat. No. 4,360,617) for example.

A further group of preferred sterically hindered phenols are derived from substituted benzenecarboxylic acids, in particular from substituted benzenepropionic acids.

Particularly preferred compounds from this class are compounds of formula

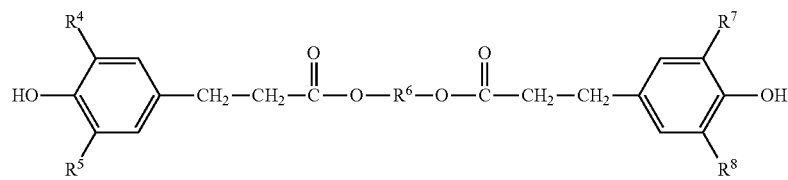

where $R^4$, $R^5$, $R^7$ and $R^8$ independently of one another represent $C_1$-$C_8$ alkyl groups which may themselves be substituted (at least one of them is a sterically demanding group) and $R^6$ represents a divalent aliphatic radical having 1 to 10 carbon atoms which may also have C—O bonds in the main chain.

Preferred compounds conforming to this formula are

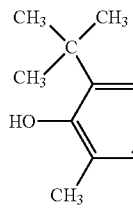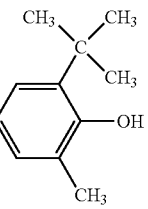

(Irganox® 245 from BASF SE)

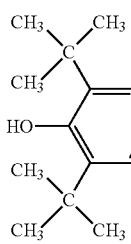 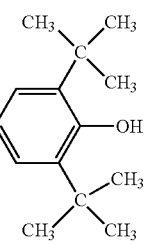

(Irganox® 259 from BASF SE)

Examples of sterically hindered phenols that may be mentioned include:
2,2'-methylenebis(4-methyl-6-tert-butylphenol), 1,6-hexanediol bis[3-(3,5-di-tert-butyl-4-hydroxyphenyl) propionate], pentaerythrityl tetrakis[3-(3,5-di-tert-butyl-4-hydroxyphenyl)propionate], distearyl 3,5-di-tert-butyl-4-hydroxybenzylphosphonate, 2,6,7-trioxa-1-phosphabicyclo[2.2.2]oct-4-ylmethyl 3,5-di-tert-butyl-4-hydroxyhydrocinnamate, 3,5-di-tert-butyl-4-hydroxyphenyl-3,5-distearylthiotriazylamine, 2-(2'-hydroxy-3'-hydroxy-3',5'-di-tert-butylphenyl)-5-chlorobenzotriazole, 2,6-di-tert-butyl-4-hydroxymethylphenol, 1,3,5-trimethyl-2,4,6-tris(3,5-di-tert-butyl-4-hydroxybenzyl)benzene, 4,4'-methylenebis(2,6-di-tert-butylphenol), 3,5-di-tert-butyl-4-hydroxybenzyldimethylamine.

Compounds which have proven particularly effective and are therefore employed with preference are 2,2'-methylenebis(4-methyl-6-tert-butylphenol), 1,6-hexanediol bis(3,5-di-tert-butyl-4-hydroxyphenyl)propionate (Irganox® 259), pentaerythrityl tetrakis[3-(3,5-di-tert-butyl-4-hydroxyphenyl)propionate] and N,N'-hexamethylenebis-3,5-di-tert-butyl-4-hydroxyhydrocinnamide (Irganox® 1098) and the abovedescribed Irganox® 245 from BASF SE which is particularly suitable.

The antioxidants G) which may be employed individually or as mixtures are present in an amount of from 0.05 up to 3 wt %, preferably from 0.1 to 1.5 wt %, in particular 0.1 to 1 wt %, based on the total weight of the molding compositions A) to E).

In some cases sterically hindered phenols having not more than one sterically hindered group in the position ortho to the phenolic hydroxyl group have proven particularly advantageous, in particular when determining color stability during storage in diffuse light over relatively long periods.

As component E) the molding compositions according to the invention may comprise 0.05 to 5, preferably 0.1 to 2 and in particular 0.25 to 1.5, wt % of a nigrosine.

The term nigrosines is generally understood to mean a group of black or gray phenazine dyes (azine dyes) in various embodiments (water-soluble, liposoluble, gasoline-soluble) which is related to the indulines and used in wool dyeing and printing, in the black coloring of silks, for dyeing leather, shoe polishes, varnishes, plastics, heat-cured coatings, inks and the like, and also as microscopy dyes.

Nigrosines are obtained industrially by heating nitrobenzene, aniline and aniline hydrochloride with metallic iron and FeCl$_3$ (name derives from the Latin niger=black).

Component E) may be used as the free base or else as a salt (for example hydrochloride).

For further details concerning nigrosines see for example the electronic lexicon Römpp Online, Version 2.8, Thieme-Verlag Stuttgart, 2006, under "Nigrosin".

As component E) the thermoplastic molding compositions according to the invention may comprise customary processing aids such as stabilizers, oxidation retarders, agents to counteract thermal degradation and ultraviolet light degradation, lubricants and release agents, colorants such as dyes and pigments, nucleating agents, plasticizers, etc.

Examples of oxidation retarders and heat stabilizers include sterically hindered phenols and/or phosphites and amines (e.g. TAD), hydroquinones, aromatic secondary amines such as diphenylamines, various substituted representatives of these groups and mixtures thereof in concentrations of up to 1 wt % based on the weight of the thermoplastic molding compositions.

Useful UV stabilizers which are generally used in amounts of up to 2 wt % based on the molding composition include various substituted resorcinols, salicylates, benzotriazoles, and benzophenones.

Colorants which may be added include inorganic pigments, such as titanium dioxide, ultramarine blue, iron oxide, and carbon black, also organic pigments, such as phthalocyanines, quinacridones, and perylenes, and also dyes such as anthraquinones.

Nucleating agents which may be employed include sodium phenylphosphinate, aluminum oxide, silicon dioxide and preferably talc.

The thermoplastic molding compositions according to the invention may be prepared by processes known per se, by mixing the starting components in customary mixing apparatuses, such as screw extruders, Brabender mixers or Banbury mixers, and subsequently extruding the resulting mixture. After extrusion, the extrudate may be cooled and comminuted. It is also possible to premix individual components and then add the remaining starting materials individually and/or likewise in the form of a mixture. The mixing temperatures are generally from 230° C. to 320° C.

In a further preferred procedure, components B) to E) may be mixed with a prepolymer, formulated and pelletized. The pelletized material obtained is then condensed to the desired viscosity either continuously or batchwise under inert gas in the solid phase at a temperature below the melting point of component A).

The thermoplastic molding compositions according to the invention exhibit a better (intrinsic) flame resistance (heat release capacity), flowability, better surface properties (gloss), reduced residue upon combustion, better adhesion to metal surfaces and effective flame retardancy with a lower content of the flame retardant additive in the molding composition.

The invention further provides for the use of the polyamides B) for reducing the specific heat of combustion or the heat release capacity or both properties by at least 5%, preferably 7%, compared to a molding composition according to claim 1 without component B).

These are therefore suitable for producing fibers, films and molded articles of any type. A number of examples are recited below: plug connectors, plugs, plug parts, cable harness components, circuit mounts, circuit-mount components, three-dimensionally injection-molded circuit mounts, electrical connection elements, and mechatronic components.

The molded articles or semifinished products producible from the thermoplastic molding compositions according to the invention may be employed for example in the motor vehicle, electrical, electronics, telecommunications, information technology, entertainment and computer industries, in vehicles and other means of transportation, in ships, spacecraft, in the household, in office equipment, in sport, in medicine and generally in objects and parts of buildings requiring enhanced flame retardancy.

Possible uses of polyamides with improved flowability for the kitchen and household sectors include the production of components for kitchen appliances, for example fryers, clothes irons, knobs/buttons, and also applications in the garden and leisure sectors.

EXAMPLES

The following components were employed:
Component A1:
Polyamide 66 having a viscosity number VN of 120 ml/g, measured as a 0.5 wt % solution in 96 wt % of sulfuric acid at 25° C. as per ISO 307 (Ultramid® A24 from BASF SE was employed.)
Component A2:
Polyamide 6 having a viscosity number VN of 150 ml/g, measured as a 0.5 wt % solution in 96 wt % of sulfuric acid at 25° C. as per ISO 307 (Ultramid® B27 from BASF SE was employed.)
Components B:
The pyrrolidone-containing polymers B) were obtained as per the procedure described in DE4333238A1. The polymers in the examples were produced as follows:
Polymer B1A:
A 1000 ml round-necked flask was charged with 325 g (2.5 mol) of itaconic acid (ICA), 300 g of deionized water and 347 g (2.55 mol) of m-xylylene diamine (MXDA). The reaction mixture was held at 108° C. under reflux for 60 min. The temperature was increased stepwise to 200° C. over one hour to distill-off water and the pressure was then reduced stepwise to 3 mbar to carry out the polycondensation under these conditions over a total of 75 minutes. (in each case with low diamine excess)

The polymer (50 mol % ICA, 50 mol % MXDA) had a Tg of 145° C.,
an Mn/Mw of 4300/10400 g/mol and a VN of 27 ml/g.
Polyamide B2A:
A 1000 ml four-necked flask was charged with 260 g (2 mol) of itaconic acid, 83 g (0.5 mol) of isophthalic acid (IPA), 300 g of DI water and 347 g (2.55 mol) of m-xylidenediamine. The reaction mixture was stirred under reflux for 60 minutes at 108° C. The temperature was then increased to 200° C. over 60 min and water was distilled off. At the same temperature, a pressure of 3 mbar was then applied for 15 minutes.

The polymer (40 mol % ICA, 10 mol % IPA, 50 mol % MXDA) had a Tg of 141° C., a Mn/Mw of 3040/7700 g/mol and a VN of 13 ml/g.

Polyamide B3A:
A 1000 ml four-necked flask was charged with 260 g (2 mol) of a itaconic acid, 73 g (0.5 mol) of adipic acid (AA), 300 g of DI water and 347 g (2.55 mol) of m-xylidenediamine. The reaction mixture was stirred under reflux for 60 minutes at 108° C. The temperature was then increased to 200° C. over 60 min and water was distilled off. At the same temperature, a vacuum of 3 mbar was then applied for 15 minutes.

The polymer (40 mol % ICA, 10 mol % AA, 50 mol % MXDA) had a Tg of 127° C., a Mn/Mw of 7830/20100 g/mol and a VN of 33 ml/g.
Polyamide B3B:
Production was effected as above for B3A.

The polymer (30 mol % ICA, 20 mol % AA, 50 mol % MXDA) had a Tg of 114° C., a Mn/Mw of 9550/25600 g/mol and a VN of 42 ml/g.
Polyamide B4A:
Production was effected as above for B3A but with terephthalic acid (TPA) instead of adipic acid as additional monomer B1.

The polymer (40 mol % ICA, 10 mol % TPA, 50 mol % MXDA) had a Tg of 126° C., a Mn/Mw of 5490/20900 g/mol and a VN of 32 ml/g.
Polyamide B5A:
Production was effected as above for B3A but with hexamethylenediamine (HMD) instead of adipic acid as additional monomer B2.

The polymer (50 mol % ICA, 25 mol % HMD, 25 mol % MXDA) had a Tg of 109° C., a Mn/Mw of 8950/29900 g/mol and a VN of 52 ml/g.
Polyamide B6A:
A 250 ml round-necked flask was charged with 52 g (0.4 mol) of itaconic acid (ICA), 50 g of deionized water and 74 g (0.41 mol) of 2,5-bis(aminomethyl)furan (BAMF) as 70% strength aqueous solution. The reaction mixture was held at 108° C. under reflux for 60 min. The temperature was increased stepwise to 200° C. over one hour to distill-off water and the pressure was then reduced stepwise to 3 mbar to carry out the polycondensation under these conditions over a total of 75 minutes.

The polymer (50 mol % ICA, 50 mol % BAMF) had a Tg of 127° C.,
an Mn/Mw of 6200/72000 g/mol and a VN of 14 ml/g.
Component C1:
40% strength concentrate of red phosphorus having an average particle size ($d_{50}$) of 10 to 30 µm in polyamide 6 (obtainable from Italmatch Chemicals Group).
Component C2A:
Aluminum diethylphosphinate (Exolit®OP1230 from Clariant GmbH), particle size ($d_{90}$)=80 µm
Component C2B:
Aluminum diethylphosphinate (Exolit®OP935 from Clariant GmbH): particle size ($d_{90}$)=5.613 µm determined with a Mastersizer 2000 (measuring range 0.02-20 000 µm) in water.
Component C3:
Melamine cyanurate (Melapur®MC 50 from BASF SE)
Component C4:
Aluminum hypophosphite (obtainable from Italmatch Chemicals Group)
Component C5:
Melamine polyphosphate (Melapur® M200 from BASF SE)
Component D1:
Chopped glass fibers having an average diameter of 10 µm Component D2:

Sigrafil C30 0/90 biaxial carbon fiber fabric having a basis weight of 408 g/m² obtainable from SGL Kümpers GmbH & Co. KG.

Component D3:

Talc (CAS-No. 14807-96-6) having an average particle size (d50) of 1.7 µm determined with a Sedigraph 51XX instrument (Micromeritics Instrument Corporation) marketed under the brand name Microtalc IT extra by MONDO MINERALS B.V. (Netherlands).

Production of the Molding Compositions

Production of the molding compositions was effected on three extruders as described hereinbelow. The respective examples indicate the equipment used.

The DSM Xplore 15 microcompounder was operated at a temperature of 260-280° C. The rotational speed of the twin screws was 60 rpm. The residence time of the polymers after feeding of the extruder was about 3 min. The microcompounder indicates the screw force required to achieve the prescribed rotational speed.

To produce molded articles from compositions produced on the DSM Xplore 15 microcompounder the polymer melt was transferred by means of a heated melt vessel into the 10 cc Xplore micro-injection molding machine and immediately injected into the mold. A mold temperature of 60° C. was used. Injection molding was effected in three stages; 16 bar for 5 s, 16 bar for 5 s and 16 bar for 4 s.

Further molding compositions were produced by means of a ZE25A UTXi twin-screw extruder (KraussMaffei Berstorff GmbH, Germany). The temperature profile was increased from 40° C. in zone 1, to 260° C. (zone 2), to 280° C. (zones 3-11) and kept constant. A rotational speed of 250 rpm was established, resulting in a throughput of about 15 kg/h. The extrudate was pulled through a water bath and pelletized.

Further molding compositions were processed by means of a Haake Rheomex CTW 100 OS twin-screw extruder (Thermo Fisher Scientific Inc.). Zones 1 to 3 of the extruder were kept at 280° C. and a die temperature of 270° C. was employed. The extruder was operated at a rotational speed of 100 RPM, resulting in throughputs of 1.5 kg/h. The torque required to achieve the rotational speed was recorded during the process. The extrudate was pulled through a water bath and pelletized.

Production of molded articles from pelletized extrudate was effected on Arburg Allrounder 470H and Arburg Allrounder 420C injection molding machines (ARBURG GmbH+Co KG) employing a melt temperature of 270° C. to 290° C., a screw speed of 100 RPM, injection pressures of 500 bar to 1100 bar, holding pressures of 500 bar to 1000 bar, a back pressure of 50 bar and a mold temperature of 80° C.

Production of Carbon-Fiber-Reinforced Molding Compositions

After storage under liquid nitrogen for 3 min, pelletized extrudates were comminuted by means of a ZM200 ultracentrifugation mill (Retsch) with a 1.5 mm screen pack to afford a fine powder. The powder was stored in a drying cabinet for 15 h at 60° C. and 30 mbar to remove moisture from the material. The dry powder was applied in uniform layers in the mold between and on the carbon fiber plies by means of a screen having a 0.5 mm mesh size. The amount of polymer was chosen such that with two carbon fiber plies a material thickness of 1.0±0.1 mm was achieved after pressing. 20.5 g to 21.5 g of pelletized material with two carbon fiber plies having a weight of 22 g to 23 g were employed. The layed-up material was placed into a press frame having internal dimensions of 16 cm×16 cm and a thickness of 0.95 mm and pressed with a Collin P200 P laboratory press from Dr. Collin GmbH. The pressing conditions were as follows: 300° C. and 10 bar for 2 min, 300° C. and 100 bar for 5 min, cooling at 100 bar to 25° C. over a period of 15 min. Cutting to size of test specimens for material testing was effected by means of a Datron CNC milling maschine (ML Cube oder M35) from the inner region of the obtained sheet.

The following measurements were carried out:

DSC:

The glass transition temperature (Tg) of the polymer was measured using a TA Instruments Q2000 differential scanning calorimeter (DSC). The cooling and heating rate was 20 K/min, the starting weight was about 8.5 mg and the purge gas was helium. Evaluation of the measured curves (second heating curve) was effected as per ISO standard 11357.

GPC:

The molecular weight Mn/Mw of the polyamides was determined as follows:

15 mg of the semiaromatic polyamides were dissolved in 10 ml of hexafluoroisopropanol (HFIP). 125 µl respectively of these solutions were analyzed by means of gel permeation chromatography (GPC). The measurements were carried out at room temperature. Elution was effected using HFIP+0.05 wt % of potassium trifluoroacetate salt. The elution rate was 0.5 ml/min. The following column combination was employed (all columns produced by Showa Denko Ltd., Japan): Shodex® HFIP-800P (diameter 8 mm, length 5 cm), Shodex® HFIP-803 (diameter 8 mm, length 30 cm), Shodex® HFIP-803 (diameter 8 mm, length 30 cm). The semiaromatic polyamides were detected by means of an RI detector (differential refractometry). Calibration was effected with narrowly distributed polymethyl methacrylate standards having molecular weights of $M_n$=505 g/mol to $M_n$=2 740 000 g/mol.

The flame resistance of the molding compositions was determined according to the method UL94-V (Underwriters Laboratories Inc. Standard of Safety, "Test for Flammability of Plastic Materials for Parts in 30 Devices and Appliances", p. 14 to p. 18 Northbrook 1998). Unless otherwise stated, five test pieces respectively were tested according to the procedure prescribed for the UL94V test after conditioning at room temperature and 50±10% relative humidity. The sum of the afterflame times for the 5 samples after first and second flame application was reported as the total burn time.

The heat release capacity, specific heat of combustion and amount of residue after pyrolysis under nitrogen were determined with an FAA Microcombustion calorimeter (from Fire Testing Technology, UK) for samples of 2.5 mg to 3.5 mg in weight, a heating rate of 1° C./s being employed and the pyrolysis oven being heated to 800° C. The afterburner was set to a temperature of 900° C. Measurement was carried out according to the procedure in ASTM D7309-13. The amount of residue was determined immediately after removal of the crucible from the instrument with a high-precision balance.

The gloss values were determined with a PCE GM-60 glossmeter from PCE Deutschland GmbH. The reported gloss values are measured relative to a blackened glass sheet having a gloss value of 90 at an angle of 60° and of 84 at an angle of 20°.

The constitutions of the molding compositions and the results of the measurements may be found in the tables.

Table 1-1 shows that, at a low concentration of flame retardants, a flame retardant effect can be achieved only by admixing the pyrrolidone-containing polyamide B1A to PA66. The force required by the extruder to maintain the rotational speed is markedly lower for the molding compositions according to the invention which is indicative of higher flowability of the molding compositions and lower stress on the equipment. Production of the molding compositions and test specimens was effected with the DSM Xplore 15 microcompounder and the Xplore micro-injection molding machine.

TABLE 1-1 constitutions and material properties

|  | 1 | comp. 1 | 2 | comp. 2 |
|---|---|---|---|---|
| A1 | 69.25 | 92.0 | 69.0 | 92.0 |
| B1A | 22.75 | 0 | 23.0 | 0 |
| C1 | 8.0 | 8.0 | 0 | 0 |
| C2A | 0 | 0 | 8.0 | 8.0 |
| UL94 1.6 mm | V-1 | V-2* | V-0 | V-2 |
| total burn time | 38 | — | 37 | 42 |
| screw force (N) | 1388 | 2468 | 1035 | 2080 |

*measurement aborted after two test pieces exhibited burning drips.

Table 1-2 shows that, at a low concentration of flame retardants, a flame retardant effect can be achieved only by admixing the pyrrolidone-containing polyamide B1A to PA6. The force required by the extruder to maintain the rotational speed is markedly lower for the molding composition according to the invention which is indicative of higher flowability of the molding compositions and lower stress on the equipment. Production of the molding compositions and test specimens was effected with the DSM Xplore 15 microcompounder and the Xplore micro-injection molding machine.

TABLE 1-2 constitutions and material properties

|  | 3 (% w/w) | comp. 3 (% w/w) |
|---|---|---|
| A2 | 42.75 | 57.0 |
| B1A | 14.25 | 0 |
| D1 | 25.0 | 25.0 |
| C2A | 0 | 0 |
| C4 | 12.0 | 12.0 |
| C3 | 6.0 | 6.0 |
| UL94 1.6 mm classification | V-0 | V-2 |
| total burn time for 5 samples (s) | 20 | 85 |
| screw force (N) | 1686 | 3720 |

As is shown in table 1-3, compared to commercially available amorphous polyamides, admixing pyrrolidone-containing polyamides achieves a markedly higher surface quality which is both visually readily apparent and demonstrated by markedly higher gloss values (table 1-3).

Selar® 3246 from DuPont is an amorphous polyamide produced by reaction of isophthalic acid and terephthalic acid with hexamethylenediamine. The employed product had a constitution of 19 g/100 g terephthalic acid, 46 g/100 g isophthalic acid and 35 g/100 g hexamethylenediamine. The employed product had a viscosity number of 79 ml/g, determined in a 0.5 wt % solution in 96 wt % sulfuric acid at 25° C. as per ISO 307.

Production of the molding compositions and test specimens was effected with the ZE25A UTXi twin-screw extruder.

TABLE 1-3 constitutions and material properties

|  | 4 | comp. 4 |
|---|---|---|
| A1 | 39.0 | 39.45 |
| A2 | 4.8 | 4.8 |
| B1A | 7.2 | 0 |
| Selar ® 3426 | 0 | 6.75 |
| D1 | 30.0 | 30.0 |
| C2A | 16.0 | 16.0 |
| C5 | 3.0 | 3.0 |
| UL94 0.8 mm | V-0 | V-0 |
| gloss value | 43.3 | 21.4 |

As is demonstrated in table 1-4, mixing commercially available polyamides with pyrrolidone-containing polyamides achieves molding compositions having a lower potential for heat release and higher pyrolysis residues. Production of the molding compositions and test specimens was effected with the DSM Xplore 15 microcompounder and the Xplore micro-injection molding machine.

TABLE 1-4 constitutions and material properties

|  | comp. 5 (% w/w) | 5 (% w/w) |
|---|---|---|
| A1 | 100 | 80 |
| B1A | 0 | 20 |
| specific heat of combustion (kJ $g^{-1}$) | 28.1 | 26.7 |
| % change compared to comp. 5 | — | −5 |
| heat release capacity (J $g^{-1}$ $K^{-1}$) | 610 | 570 |
| % change compared to comp. 5 | — | −6 |
| residue after pyrolysis | 0.2 | 12.2 |
| % change compared to comp. 5 | — | +610 |

Even when using further aromatic carboxylic acids (table 2) and also aliphatic dicarboxylic acids (table 3) in the synthesis of the pyrrolidone-containing polyamides the mixtures thereof with commercially available polyamides can achieve a markedly improved flame resistance even with a low concentration of flame retardants. Production of the molding compositions and test specimens was effected with the DSM Xplore 15 microcompounder and the Xplore micro-injection molding machine.

TABLE 2 constitutions and material properties

|  | 1 (% w/w) | comp. 1 (% w/w) | 2 (% w/w) | comp. 2 (% w/w) |
|---|---|---|---|---|
| A1 | 50.5 | 67.0 | 50.25 | 67.0 |
| B2A | 16.5 | 0 | 16.75 | 0 |
| D1 | 25.0 | 25.0 | 25.0 | 25.0 |
| C1 | 8.0 | 8.0 | 0 | 0 |
| C2A | 0 | 0 | 8.0 | 8.0 |
| UL94 1.6 mm | V-0 | V- | V-1 | V- |
| total burn time for 5 samples (s) | 17 | — | 49 | — |
| reason for failure | | burn time > 30 s | | burn time > 30 s |

TABLE 3 constitutions and material properties

|  | 1 (% w/w) | 2 (% w/w) |
|---|---|---|
| A1 | 50.5 | 50.5 |
| B3A | 16.5 | 0 |
| B3B | 0 | 16.5 |
| D1 | 25.0 | 25.0 |
| C1 | 8.0 | 8.0 |
| UL94 1.6 mm classification | V-1 | V-1 |
| total burn time for 5 samples (s) | 45 | 93 |

When, using a relatively small amount of flame retardant, the flammability of the inventive mixture of PA 66 with the pyrrolidone-containing polyamide B3A is compared with a commercially available, amorphous and semiaromatic polyamide, a markedly better rating is achieved as is shown in table 3-2. Processing can moreover be effected with a markedly lower level of stress on the extruder. The extrudate obtained in accordance with the invention had a markedly smoother surface. Production of the molding compositions was effected with the Haake Polylab extruder.

TABLE 3-2 constitutions and material properties

|  | 3 % w/w | comp. 3 % w/w |
|---|---|---|
| A/1 | 70.0 | 87.5 |
| B3A | 17.5 | 0 |
| Selar ® 3426 | 0 | 17.5 |
| C2B | 12.5 | 12.5 |
| extrudate surface qualities | smooth surface | rough surface |
| UL94 0.8 mm (storage at RT, 50% RH) | V-2 | V- |
| UL94 0.8 mm (storage at 70° C. for 168 h) | V-0 | V- |
| reason for failure | — | afterburn times > 30 s holder burning |
| extruder torque (Nm) | 8 | 11 |

Even when using further aromatic carboxylic acids in the synthesis of pyrrolidone-containing polyamides the mixtures thereof with commercially available polyamides achieve a markedly improved flame resistance even at a low concentration of flame retardants (see table 4-1 and table 4-2). In particular, molding compounds comprising pyrrolidone-containing polyamides can be produced with a markedly lower extruder torque which results in a lower level of stress on, and improved lifetime of, the extruder.

Production of the molding compositions and test specimens was effected with the DSM Xplore 15 microcompounder and the Xplore micro-injection molding machine.

TABLE 4-1 constitutions and material properties

|  | 1 (% w/w) | 2 (% w/w) | comp. 2 (% w/w) |
|---|---|---|---|
| A1 | 50.5 | 50.25 | 67.0 |
| B4A | 16.5 | 16.75 | 0 |
| D1 | 25.0 | 25.0 | 25.0 |
| C1 | 8.0 | 0 | 0 |
| C2A | 0 | 8.0 | 8.0 |
| UL94 1.6 mm classification | V-0 | V-1 | V- |
| total burn burn time for 5 samples (s) | 30 | 59 | — |
| reason for failure |  |  | burn time > 30 s |
|  | 998 | 990 | 2310 |

TABLE 4-2 constitutions and material properties.
Comparative example in table 1-2

|  | 3 (% w/w) |
|---|---|
| A/2 | 42.75 |
| B4A | 14.25 |
| D1 | 25.0 |
| C4 | 12.0 |
| C3 | 6.0 |
| UL94 1.6 mm classification | V-0 |
| total burn time for 5 samples (s) | 20 |
| extruder screw force (N) | 2574 |

When, using a relatively small amount of flame retardant, the flammability of the inventive mixture of PA 66 with the pyrrolidone-containing polyamide B4A is compared with a commercially available, amorphous and semiaromatic polyamide, a markedly better rating is achieved as is shown in table 4-3. Processing can moreover be effected with a markedly lower level of stress on the extruder. Production of the molding compositions was effected with the Haake Polylab extruder.

TABLE 4-3 constitutions and material properties

|  | 4 % w/w | comp. 4 % w/w |
|---|---|---|
| A1 | 70.0 | 70.0 |
| B4A | 17.5 | 0 |
| Selar ® 3426 | 0 | 17.5 |
| C2B | 12.5 | 12.5 |
| UL94 0.8 mm (storage at RT, 50% RH) | V-2 | V- |
| UL94 0.8 mm (storage at 70° C. for 168 h) | V-0 | V- |
| reason for failure | — | burn time > 30 s holder burning |
| extruder torque (Nm) | 8 | 11 |

The pelletized materials of the molding compositions specified in table 4-3 were additionally used to press carbon fiber composite sheets of 1 mm in thickness according to the abovedescribed process. Test specimens milled from these composite sheets likewise exhibited markedly better flame resistance after production in accordance with the invention (see table 4-4).

TABLE 4-4 constitution and fire properties of carbon fiber composite sheets.

|  | 5 % w/w | comp. 5 % w/w |
|---|---|---|
| A1 | 34.0 | 34.0 |
| B3A | 8.5 | 0 |
| Selar ® 3426 | 0 | 8.5 |
| C2B | 6.1 | 6.1 |
| carbon fiber | 51.4 | 51.4 |
| UL94 1.0 mm | V-1 | V- |
| reason for for failure | — | burn time > 30 s |

Even when using further diamines in the synthesis of pyrrolidone-containing polyamides the mixtures thereof with commercially available polyamides achieve a markedly improved flame resistance even at a low concentration of flame retardants (see table 5). Compared to exclusive use of component A, addition of the pyrrolidone-containing polyamide achieves increased residues after pyrolysis and also markedly reduced values for specific heat of combustion and heat release capacity. Processing of a molding composition according to the invention can be effected with a markedly lower level of stress on the extruder.

Production of the molding compositions and test specimens was effected with the DSM Xplore 15 microcompounder and the Xplore micro-injection molding machine.

TABLE 5

|  | 1 (% w/w) | comp. 1 (% w/w) |
|---|---|---|
| A2 | 42.75 | 57.0 |
| B5A | 14.25 | 0 |
| D1 | 25.0 | 25.0 |
| C4 | 12.0 | 12.0 |
| C3 | 6.0 | 6.0 |
| UL94 1.6 mm classification | V-0 | V-2 |
| total burn time for 5 samples (s) | 17 | 85 |
| extruder screw force (N) | 2936 | 3720 |
| residue after pyrolysis (% w/w) (excluding glass fiber) | 14.4 | 13.1 |
| % change compared to comp. 1 | +10 | — |
| specific heat of combustion (kJ g$^{-1}$) | 14.5 | 16.0 |
| % change compared to comp. 1 | −9 | — |
| heat release capacity (J g$^{-1}$ K$^{-1}$) | 213 | 236 |
| % change compared to comp. 1 | −6 | — |

As is shown in table 6, adding the pyrrolidone-containing polyamide obtained from 2,5-furandicarboxylic acid to PA6 when using a relatively small amount of flame retardant achieves a markedly better flame resistance. Compared to exclusive use of component A, addition of the pyrrolidone-containing polyamide achieves markedly increased residues after pyrolysis and also markedly reduced values for specific heat of combustion and heat release capacity. Processing of the molding composition according to the invention can be effected with a markedly lower level of stress on the extruder.

Production of the molding compositions and test specimens was effected with the DSM Xplore 15 microcompounder and the Xplore micro-injection molding machine.

TABLE 6

|  | 1 (% w/w) | comp. 1 (% w/w) | 2 (% w/w) | comp. 2 (% w/w) |
|---|---|---|---|---|
| A2 | 50.25 | 67.0 | 42.75 | 57.0 |
| B6A | 16.75 | 0 | 14.25 | 0 |
| D1 | 25.0 | 25.0 | 25.0 | 25.0 |
| C2A | 8.0 | 8.0 | 0 | 0 |
| C4 | 0 | 0 | 12.0 | 12.0 |
| C3 | 0 | 0 | 6.0 | 6.0 |
| UL94 1.6 mm classification | V-1 | V-2 | V-0 | V-2 |
| total burn time for 5 samples (s) | 73 | 131 | 25 | 85 |
| extruder screw force (N) | — | — | 2530 | 3720 |
| residue after pyrolysis (% w/w) (excluding glass fiber) |  |  | 19.4 | 13.1 |
| % change compared to comp. 2 |  |  | +48 | — |
| specific heat of combustion (kJ g$^{-1}$) |  |  | 13.6 | 16.0 |
| % change compared to comp. 2 |  |  | −15 | — |
| heat release capacity (J g$^{-1}$ K$^{-1}$) |  |  | 210 | 236 |
| % change compared to comp. 2 |  |  | −11 | — |

As is shown in table 7, adding pyrrolidone-containing polymers to PA6 markedly reduces the stress on the extruder when processing fillers.

Production of the molding compositions and test specimens was effected with the DSM Xplore 15 microcompounder.

TABLE 7

|  | 1 | 2 | 3 | 4 | 5 | 6 | comp. 1 |
|---|---|---|---|---|---|---|---|
| A2 | 63 | 56 | 63 | 56 | 63 | 56 | 70 |
| B1A | 7 | 14 | 0 | 0 | 0 | 0 | 0 |
| B3A | 0 | 0 | 7 | 14 | 0 | 0 | 0 |
| B5A | 0 | 0 | 0 | 0 | 7 | 14 | 0 |
| D3 | 30 | 30 | 30 | 30 | 30 | 30 | 30 |
| extruder screw force (N) | 1920 | 1440 | 2810 | 2100 | 2680 | 2180 | 3250 |

The invention claimed is:

1. A thermoplastic molding composition comprising
A) 10 to 98 wt % of a thermoplastic polyamide other than B),
B) 1 to 50 wt % of a thermoplastic polyamide comprising 2-pyrrolidone units as repeating units, said 2-pyrrolidone units being bonded to the further repeat units,
C) 0 to 40 wt % of a halogen-free flame retardant,
D) 0 to 60 wt % of a fibrous or particulate filler or mixtures thereof,
E) 0 to 30 wt % of further added substances,
wherein the weight percentages A) to E) sum to 100%.

2. The thermoplastic molding composition according to claim 1 comprising:
A) 10 to 98 wt %,
B) 1 to 30 wt %,
C) 1 to 40 wt %,
D) 0 to 50 wt %,
E) 0 to 30 wt %.

3. The thermoplastic molding composition according to claim 1 in which component B) is obtainable by polycondensation of a monomer mixture, based on 100 mol % of B1) and B2), of
B1) 12.5 to 50 mol % of itaconic acid, wherein 0 to 37.5 mol % of further dicarboxylic acids (distinct from itaconic acid) may be present,
B2) 12.5 to 50 mol % of at least one diamine comprising an aromatic ring, wherein 0 to 37.5 mol % of further diamines may be present.

4. The thermoplastic molding composition according to claim 3 comprising as component B2) diamines having an aromatic ring selected from the group of m-xylylenediamine, p-xylylenediamine, m- or p-phenylenediamine, 4,4'-oxydianiline, 4,4'-methylenebisbenzylamine, 1,1'-biphenyl-4,4'diamine, 2,5-bis(aminomethyl)furan or mixtures thereof.

5. The thermoplastic molding composition according to claim 1 in which component C) is constructed from red phosphorous, phosphinic acid salts, nitrogen-containing flame retardants or mixtures thereof.

6. The thermoplastic molding composition according to claim 1 in which the molecular weight Mn (number-average) of component B) according to GPC (PMMA standard and HFIP eluent) is from 1000 to 30 000 g/mol.

7. The thermoplastic molding composition according to claim 1 in which component C) is constructed from phosphinic acid salts of formula (I) or/and diphosphinic acid salts of formula (II) or polymers thereof

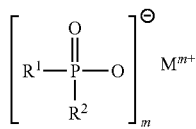
(I)

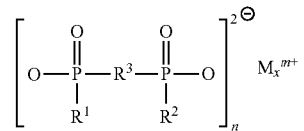
(II)

where
R$^1$, R$^2$ are identical or different and represent hydrogen, C$_1$-C$_6$-alkyl, linear or branched, and/or aryl;
R$^3$ represents C$_1$-C$_{10}$-alkylene, linear or branched, C$_6$-C$_{10}$-arylene, -alkylarylene or -arylalkylene;
M represents Mg, Ca, Al, Sb, Sn, Ge, Ti, Zn, Fe, Zr, Ce, Bi, Sr, Mn, Li, Na, K and/or a protonated nitrogen base;
m=1 to 5; n=1 to 4; x=1 to 4.

8. The thermoplastic molding composition according to claim 1 in which component C) is composed of at least one melamine compound.

9. A method for the production of fibers, films, and molded articles comprising the use of a thermoplastic molding composition according to claim 1.

10. A method for reducing a specific heat of combustion and/or a heat release capacity of a molding composition according to claim 1 by at least 5% compared to the molding composition without component B).

11. A fiber, film, or molded article obtained from a thermoplastic molding composition according to claim 1.

* * * * *